United States Patent Office 3,080,326
Patented Mar. 5, 1963

3,080,326
DENATURED ALCOHOL
William Young Samuel, Newtongrange, Midlothian, Scotland, assignor to T. & H. Smith Limited, Edinburgh, Scotland, a British company
No Drawing. Filed June 1, 1959, Ser. No. 817,027
5 Claims. (Cl. 252—366)

The invention relates to denaturants and more particularly to denatured alcohols.

The Internal Revenue Alcohol and Tobacco Tax Division of the U.S. Government authorises brucine for use as an ethyl alcohol denaturant in Formula SDA-40. Formula SDA-40 contains 3 ozs. of brucine or brucine sulphate in one-eighth of a gallon of tert.-butyl alcohol and is used to denature 100 gallons of ethyl alcohol of not less than 160° proof to provide a specially denatured alcohol for use in toilet preparations, including hair and scalp preparations, bay rum, perfume tinctures, toilet waters, shampoos, toilet soaps, bath salts, external pharmaceuticals, theater sprays, etc. Recently there has been an acute shortage of brucine and the Internal Revenue Alcohol and Tobacco Tax Division has authorised modified formulae requiring the use of less brucine or its replacement by quassin, as follows:

SD–40–1M—1½ ozs. brucine alkaloid
SD–40–2M—1½ ozs. brucine sulphate
SD–40–3—1½ ozs. quassin all per 100 gallons of ethyl alcohol.

However, limitations on the supply of quassin make it an incomplete answer to the shortage of brucine. Because brucine and quassin are derived from natural products, there must always remain the risk that the supply of these denaturants may become inadequate.

An object of the present invention is to provide new denaturants and denatured materials. It is a further object of the invention to provide a denatured ethyl alcohol which has a sufficiently bitter taste to render it unpotable. It is a further object of the invention to provide denaturants which can readily be synthesised. It is a still further object of the invention to provide substances which are effective denaturants for volatile organic liquids such as the lower alcohols and especially ethyl alcohol in extremely low concentrations, e.g., below about 0.01% by weight.

We have found that quaternary halides of ω-diethyl-amino-2,6-dimethylacetanilide in which the quaternising radical is a phenylmethyl radical or a ring-substituted phenylmethyl radical, such as o- or p-chlorobenzyl, have an extremely bitter taste which is manifest in solutions of such quaternary halide at extremely low concentrations, e.g., below 0.01%; this renders them particularly suitable for use as denaturants, particularly for denaturing lower alcohols, such as ethanol, to render them unpotable. These quaternary halides can readily be synthesised from available raw materials and can be used as effective denaturants in quantities much less than brucine or quassin. They satisfy the requirements of a denaturant for ethyl alcohol to be used for surgical or toilet purposes in that they are colourless, soluble in both alcohol and water, do not give colored solutions in alcohol or water and do not produce allergic reactions.

The quaternary salts of the invention which are characterised by extreme bitterness can be represented by the following general formula:

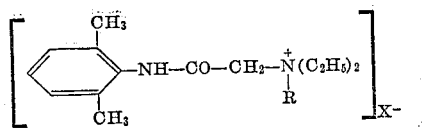

wherein
X represents a halogen atom having an atomic weight greater than 20, and
R represents a benzyl or ring-substituted benzyl radical, such as o- or p-chlorobenzyl.

Quaternary salts of the above general formula can be prepared according to the method described in co-pending application Serial No. 816,691 of Robert G. Johnston, William Barnes, and Colin G. Haining, filed on even date herewith, and now abandoned.

For denaturing ethyl alcohol, a quaternary salt of the above general formula, such as ω-diethylamino-2,6-dimethylacetanilide benzyl chloride, may be simply dissolved in the alcohol.

The proportion of the quaternary salt used with the alcohol to denature it may vary over a wide range, although, generally speaking, only small amounts are required, ethyl alcohol containing as little as 0.005% by weight or even less being quite unpotable. The larger the proportion of denaturant, the more distasteful will be the denatured alcohol but it is naturally undesirable to use any more than is necessary for making the alcohol unpotable. Concentrations of less than 0.01% by weight will suffice for this purpose and at concentrations as low as 0.0005% by weight the bitterness is quite apparent. Preferably concentrations from 0.01% to 0.001% by weight are employed to denature ethyl alcohol which may be of any desired strength but is generally 95% v./v.

The invention is illustrated by but is not limited to the following example.

Example

In 100 gallons (U.S.) of 95% v./v. ethyl alcohol there were dissolved 100 grains of ω-diethylamino-2,6-dimethylacetanilide benzyl chloride. This gave a denatured ethyl alcohol containing approximately 0.0021% by weight of the quaternary salt.

Similar proportions of the quaternary salt can be used to denature ethyl alcohol of a different strength, e.g., 90%, 80% or 70% v./v.

In place of ω-diethylamino-2,6-dimethylacetanilide benzyl chloride, there can be used an equal amount of another quaternary salt of the general formula given, such as ω-diethylamino-2,6-dimethylacetanilide o-chlorobenzyl chloride or p-chlorobenzyl chloride.

I claim:
1. A denatured alcohol containing as an essential denaturant, a denaturing quantity of a quaternary salt represented by the following general formula:

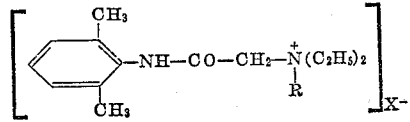

wherein

X represents a halogen atom having an atomic weight greater than 20, and

R represents a radical selected from the group which consists of the phenylmethyl radical and halogen-substituted phenylmethyl radicals.

2. A denatured alcohol containing as an essential denaturant, a denaturing quantity of ω-diethylamino-2,6-dimethylacetanilide benzyl chloride.

3. A denatured alcohol containing as an essential denaturant, a denaturing quantity of ω-diethylamino-2,6-dimethylacetanilide p-chlorobenzyl chloride.

4. A denatured alcohol containing as an essential denaturant, a denatured quantity of ω-diethylamino-2,6-dimethylacetanilide o-chlorobenzyl chloride.

5. Ethyl alcohol containing less than 0.01% but more than 0.0005% by weight of ω-diethylamino-2,6-dimethylacetanilide benzyl chloride.

References Cited in the file of this patent

UNITED STATES PATENTS

| | | |
|---|---|---|
| 2,163,834 | Figg | June 27, 1939 |
| 2,179,997 | Figg | Nov. 14, 1939 |
| 2,179,998 | Figg | Nov. 14, 1939 |
| 2,218,233 | Figg | Oct. 15, 1940 |

OTHER REFERENCES

Lofgren et al.: Svensk Kem. Tsdskr., vol. 58 (1946), pp. 219–230.

Hach et al.: Experientia, vol. 12 (1956), pp. 112–114.